UNITED STATES PATENT OFFICE.

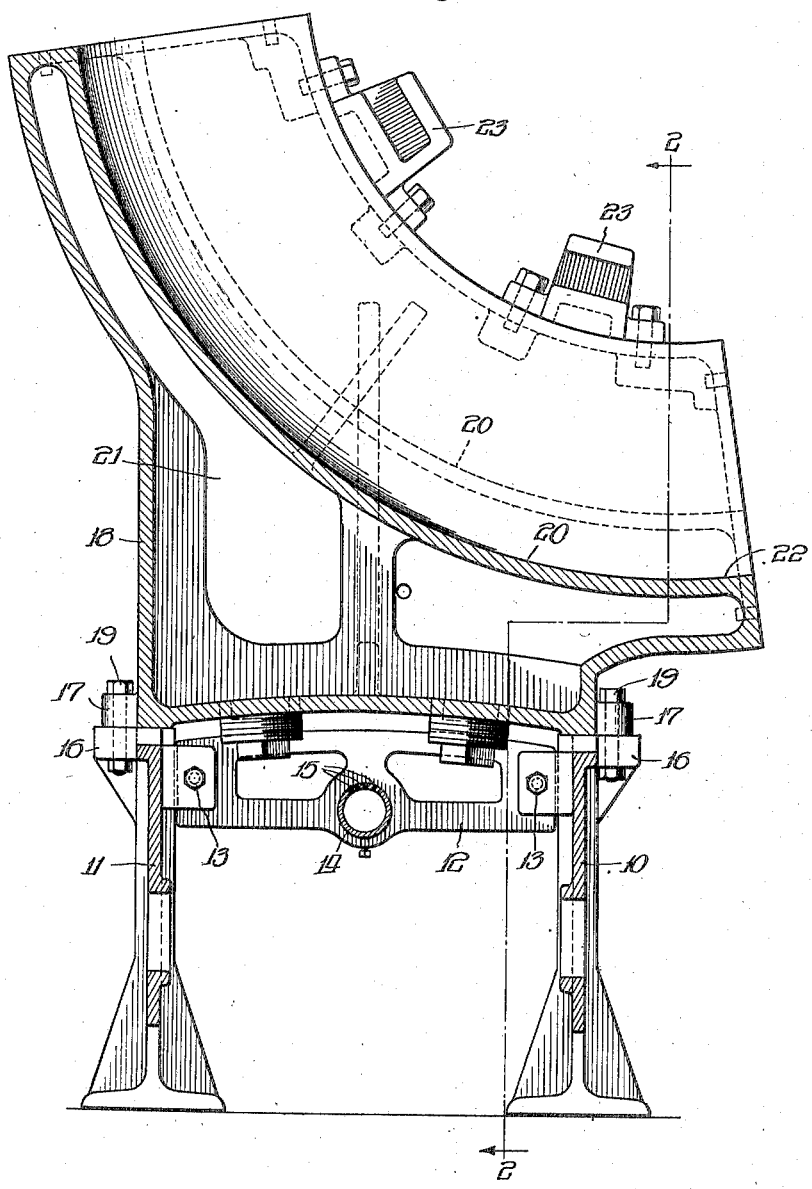

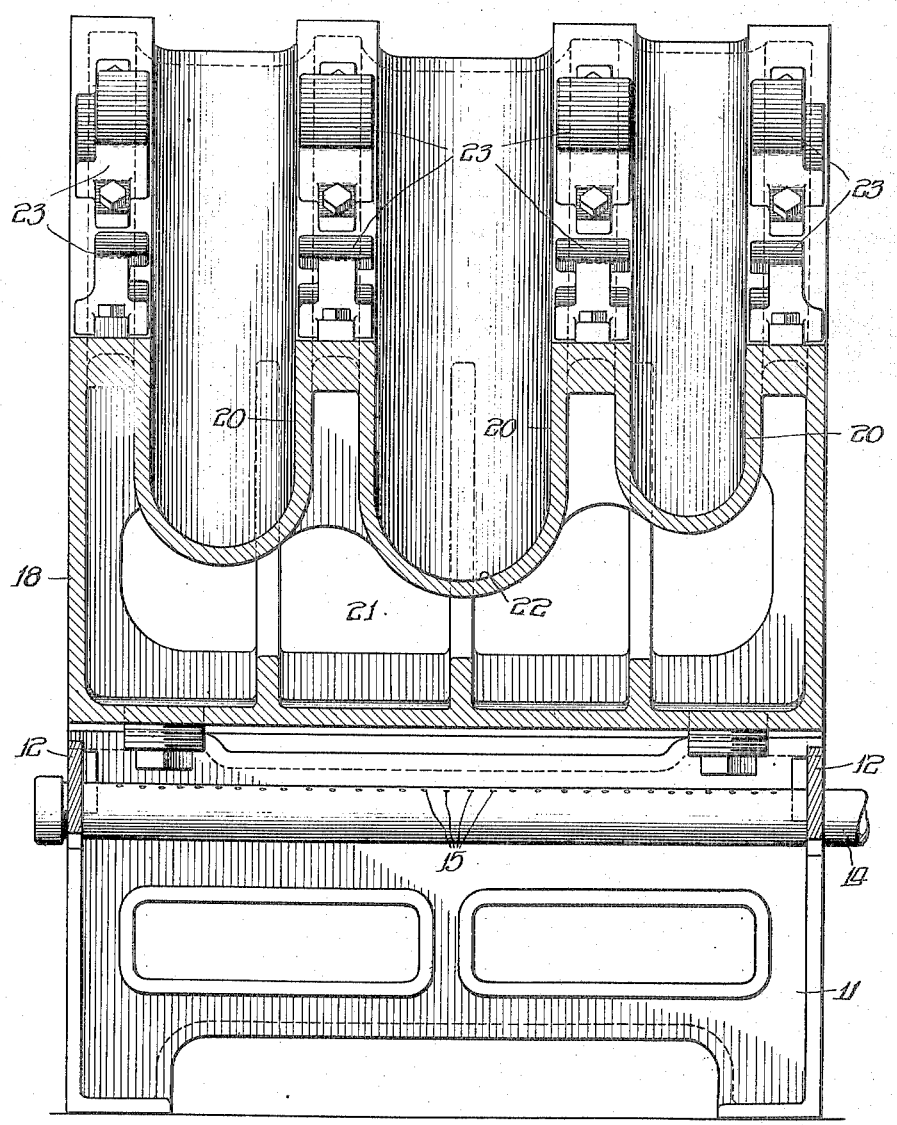

HERBERT K. WHEELOCK, OF CHICAGO, ILLINOIS, ASSIGNOR TO WESTERN VULCANIZER MANUFACTURING COMPANY, A COPARTNERSHIP CONSISTING OF HERBERT K. WHEELOCK, FRANK A. WELLER, AND WALTER R. FONTAINE, OF CHICAGO, ILLINOIS.

VULCANIZER.

1,321,961.        Specification of Letters Patent.      Patented Nov. 18, 1919.

Application filed May 15, 1919. Serial No. 297,196.

*To all whom it may concern:*

Be it known that I, HERBERT K. WHEELOCK, a citizen of the United States, residing at Chicago, in the county of Cook and State of Illinois, have invented certain new and useful Improvements in Vulcanizers, of which the following is a specification.

My invention relates to vulcanizers and refers particularly, although not exclusively, to vulcanizers for retreading or otherwise repairing the casings of automobile and other tires.

I am aware that apparatus for vulcanizing sections of tires, or for retreading the same, is well known, this apparatus consisting of an arcuate vulcanizing bed for receiving a portion of the tire, and the bed being partially surrounded by a steam chamber, which serves to provide the necessary heat for the process of vulcanization. The arcuate vulcanizing bed has ends in substantially the same horizontal plane, so that after the vulcanization is completed, it is necessary to lift the tire from its bed. This is often a difficult operation on account of the tendency for the tire to stick somewhat to the vulcanizing bed, and it has often happened that in so removing the tires, the operators have been ruptured or otherwise severely strained.

It is one of the objects of my invention to so construct the vulcanizer that the tires after vulcanization may be readily removed therefrom. This object, described in general terms, is accomplished by so disposing the arcuate vulcanizing bed that one end of it is considerably higher than the other, so that the tire may be quickly and easily removed by a slight pull in a horizontal direction.

This and other objects of my invention will be more readily understood by reference to the accompanying drawings, in which—

Figure 1 is a vertical section through the vulcanizer of my invention; and

Fig. 2 is a vertical section taken on the line 2—2 of Fig. 1.

The support for the vulcanizer consists of a front bracket 10 and a rear bracket 11, which are connected by a pair of brackets 12 located at the ends of the brackets 10 and 11 and fastened thereto by means of bolts 13. The brackets 12 serve to support a gas pipe 14 provided with a plurality of apertures 15 on its upper surface. The brackets 10 and 11 are provided with lugs 16, which register with corresponding lugs 17 on the lower portion of the vulcanizer 18, the lower part of the vulcanizer being supported on the upper edges of the brackets 10 and 11. The vulcanizer is securely attached to its base, consisting of the brackets 10, 11 and 12, by means of the bolts 19.

The vulcanizer 18 consists of the arcuate vulcanizing beds 20, which are parallel to each other and of varying cross section, as clearly shown in Fig. 2, in order to accommodate different sizes of tires. The vulcanizing beds 20 are partially surrounded by the steam chamber 21. As most clearly shown in Fig. 1, the vulcanizer 18 is so made that each of the vulcanizing beds 20 has its lowest portion, as, for instance, 22, substantially at one end of the vulcanizing bed. Each of the vulcanizing beds 20 has adjacent thereto a series of lugs 23 for the purpose of receiving clamps to hold the tire casings firmly in position when the latter are being vulcanized.

Having thus described the construction of the apparatus used in my invention, the operation of the same may now be readily understood.

Water is first introduced into the lower portion of the steam chamber 21 through any suitable pipe, which, for the sake of simplicity, is not shown in the drawings. The gas entering through the pipe 14 being ignited, the water contained in the lower portion of the chamber 21 is heated and forms steam within the steam chamber. This steam is kept at a constant pressure by means of a suitable blow-off valve, which also for the sake of simplicity is not shown in the drawings.

The vulcanizing beds being thus heated by steam at a constant pressure to a constant temperature, the tire casings to be retreaded or otherwise repaired are placed in the vulcanizing beds and suitably clamped in position. By means of the heat passing from the steam chamber 21 through the metallic walls of the vulcanizing beds, the tires are vulcanized.

When this operation is completed, the clamps are removed, and it will be evident that the tires may be quickly and easily removed from the vulcanizing beds by pulling or rolling them out at the lower end 22 of the appropriate vulcanizing bed 20.

It will be evident to those skilled in the art that many changes could be made in the detailed construction of the parts which are described without departing from the spirit or scope of my invention.

What I claim is:

1. In apparatus for vulcanizing tires, the combination of an arcuate vulcanizing bed, means for heating said bed, and means for supporting said bed so that one end of the same is substantially higher than the other but in a different vertical plane.

2. In apparatus for vulcanizing tires, the combination of an arcuate vulcanizing bed, and means for heating said bed, comprising a steam chamber adjacent to said bed and of greater depth toward one end of said bed than toward the other, whereby when the bottom of said chamber is horizontal one end of said bed will be higher than the other.

3. In apparatus for vulcanizing tires, a vulcanizer having therein a plurality of vulcanizing beds of different cross sectional areas, means for heating said beds, and means for supporting said vulcanizer so that one end of each of said vulcanizing beds is located at substantially the lowest point of said bed but in a different vertical plane from the other end thereof.

Signed at Chicago, Illinois, this 6th day of May, 1919.

HERBERT K. WHEELOCK.